July 6, 1948.    T. W. BROWN    2,444,630
COMBINED TACHOMETER AND ACCELEROMETER
Filed Dec. 15, 1945    6 Sheets-Sheet 1

July 6, 1948. T. W. BROWN 2,444,630
COMBINED TACHOMETER AND ACCELEROMETER
Filed Dec. 15, 1945 6 Sheets-Sheet 3

Inventor.
Thomas W. Brown
by Geo. K. Woodworth
Att'y.

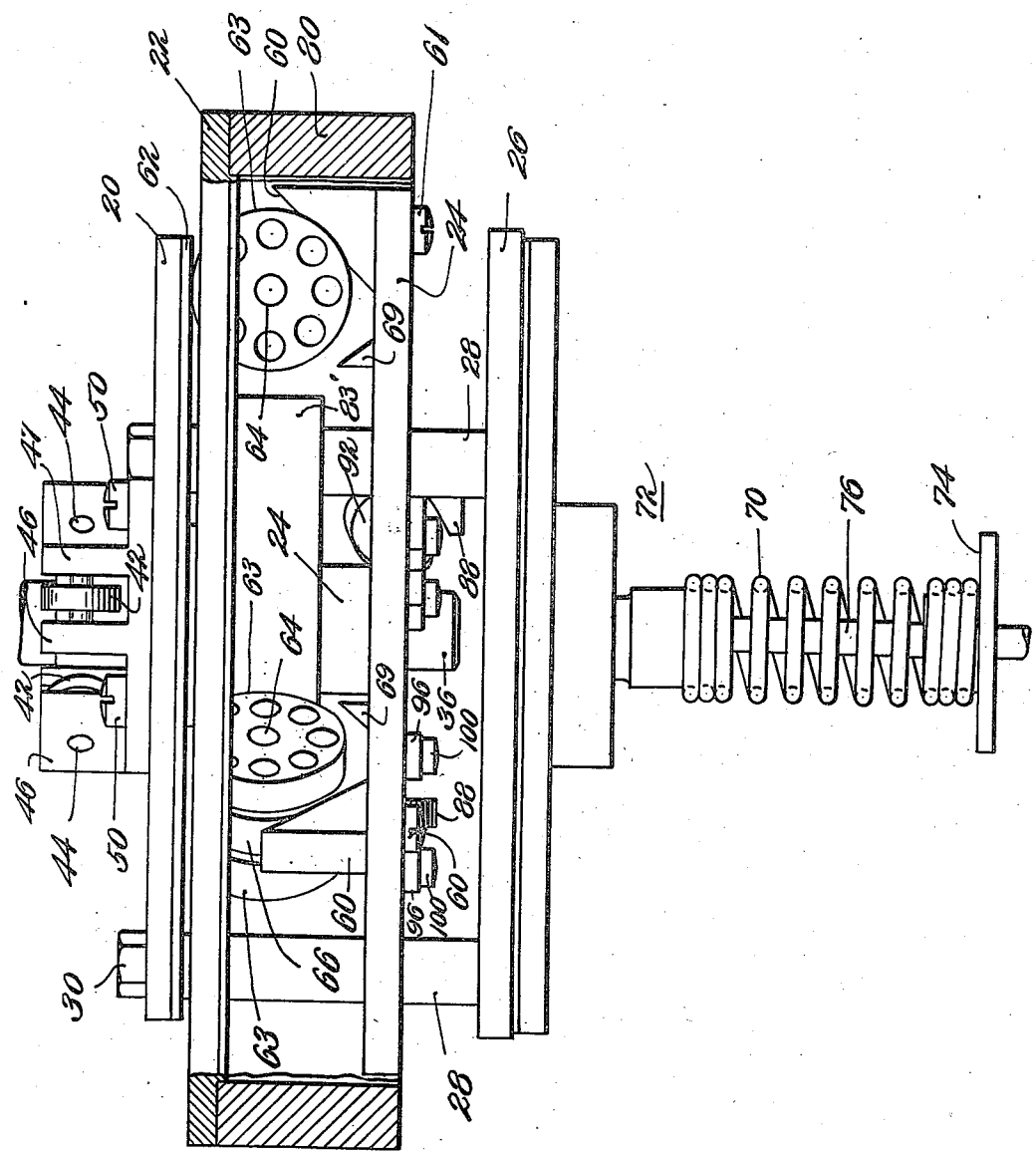

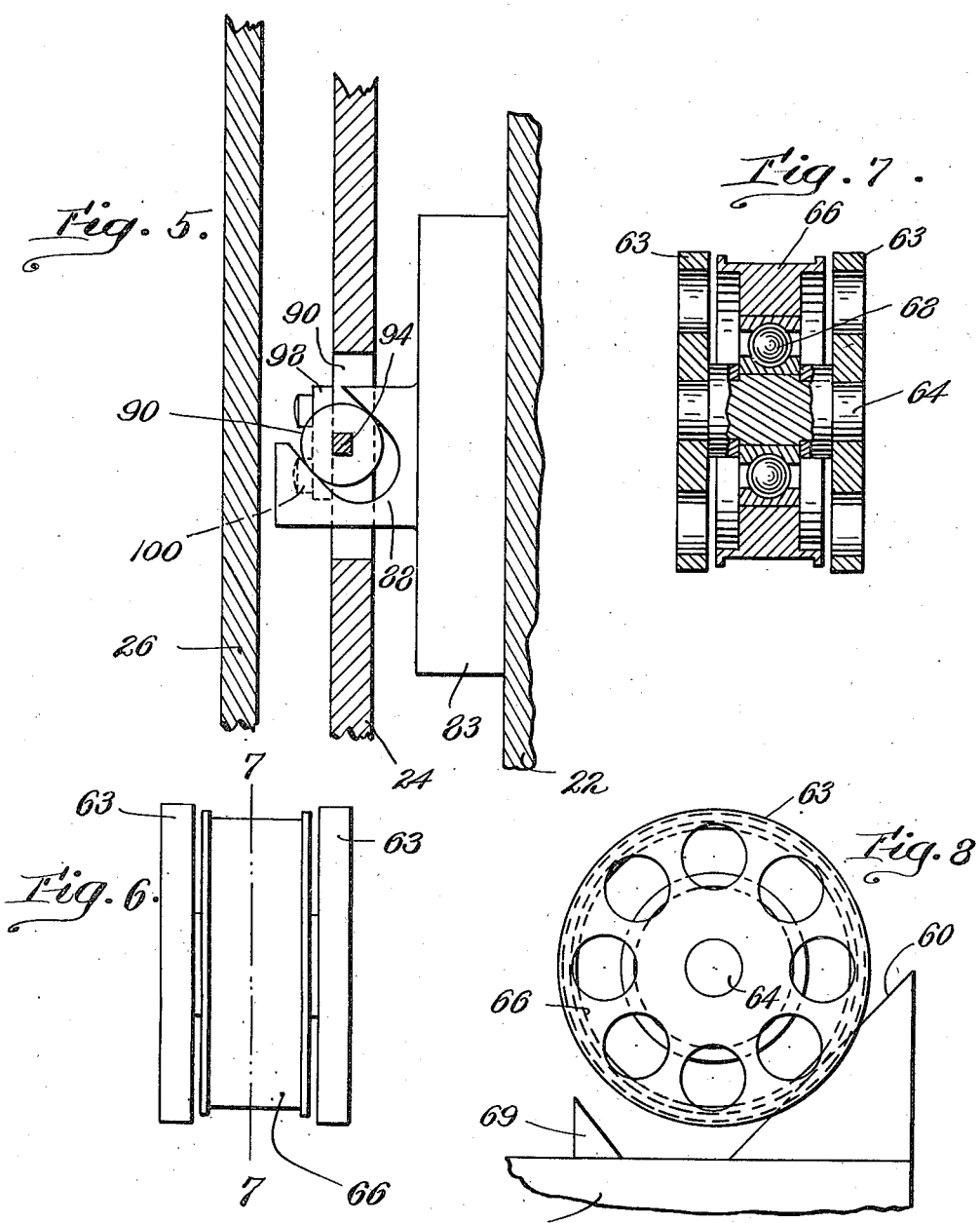

July 6, 1948.  T. W. BROWN  2,444,630
COMBINED TACHOMETER AND ACCELEROMETER
Filed Dec. 15, 1945  6 Sheets-Sheet 6

Inventor.
Thomas W. Brown
by Geo. K. Woodworth
Atty.

Patented July 6, 1948

2,444,630

UNITED STATES PATENT OFFICE 2,444,630

COMBINED TACHOMETER AND ACCELEROMETER

Thomas W. Brown, Framingham, Mass., assignor to Lombard Governor Corporation, Ashland, Mass., a corporation of Massachusetts Application December 15, 1945, Serial No. 635,387

1 Claim. (Cl. 264—6)

This invention relates to a combined tachometer and accelerometer for measuring or controlling speed, or both.

The object of the invention, broadly stated, is the provision of such an instrument that will respond to changes in acceleration linearly, that is, one unit of acceleration will produce one unit of force regardless of the actual speed or the position of the speed responsive element.

By the addition of the usual equipment, including a valve actuated by my improved tachometer and accelerometer, a servomotor and source of fluid pressure, between which and said servomotor said valve is interposed, an extremely sensitive and quick acting precision governor for controlling the speed of a prime mover, such as a water turbine, is produced.

Another object of the invention is to provide an instrument of the class described wherein the effect of a retractile spring in opposing the change of position of a rotating member produced by centrifugal force is rendered substantially constant throughout the range of speeds for which the apparatus is designed.

Other objects of my invention and the new and useful results effected thereby will appear from the detailed description of the particular embodiment thereof selected for illustration.

In the accompanying drawings illustrating an embodiment of my invention which has given good results in practice;

Fig. 4 is a front elevation, partly in section.

Fig. 5 is a vertical section taken on the line 5—5 of Fig. 3.

Fig. 6 is an elevation of a compound roller assembly which is interposed between a cam and follower.

Fig. 7 is a central vertical section taken on the line 7—7 of Fig. 6.

Fig. 8 is a side elevation of said compound roller assembly with one of the end rollers removed for clearness of illustration;

Fig. 12 is a perspective view of one of said helical cams and its co-operating follower.

Fig. 13 is a fragmentary view illustrating a modified form of cam that may be employed.

Figure 1:
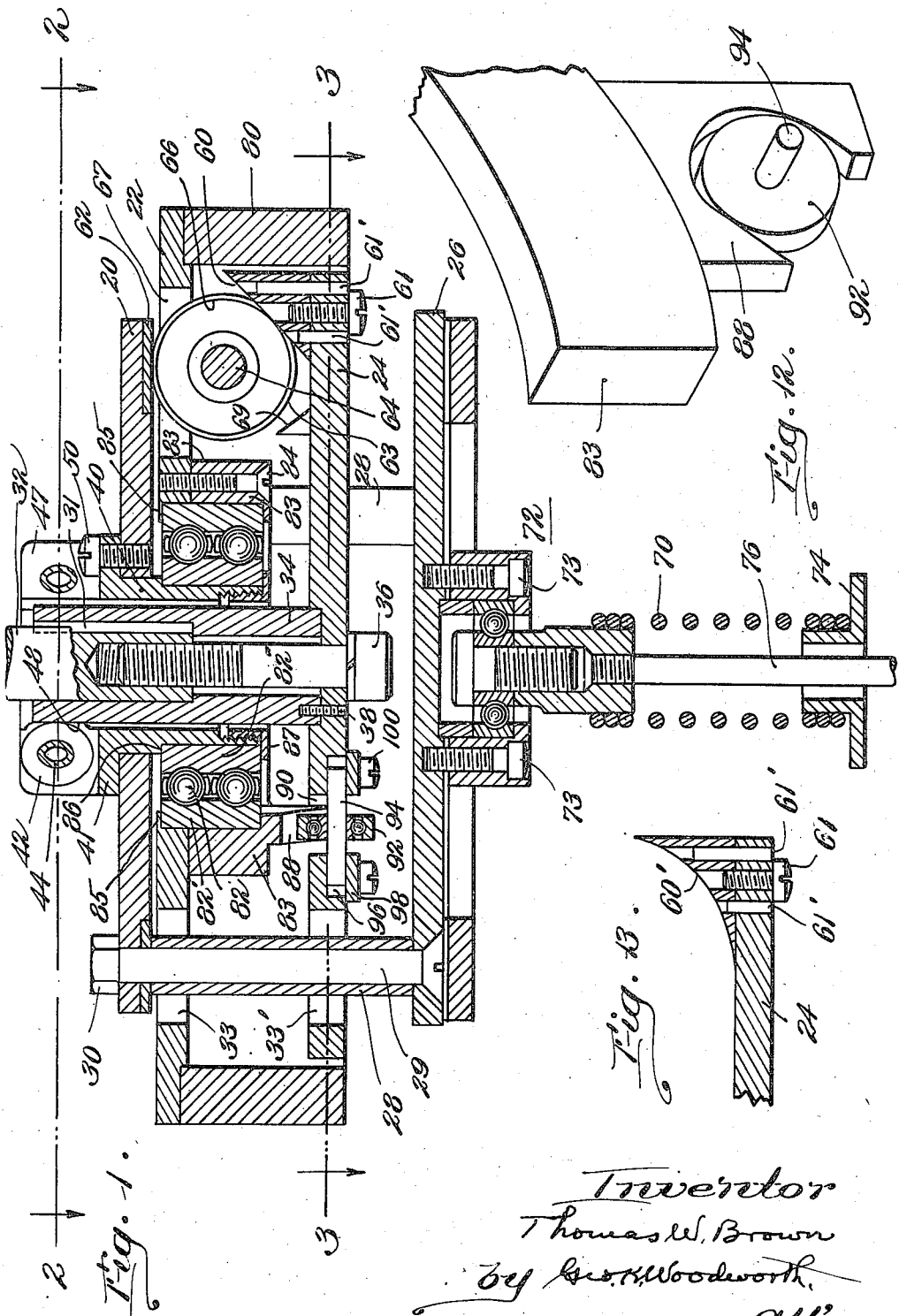
Figure 1 is a central vertical section taken on the line 1—1 of Fig. 3.
Figure 2:
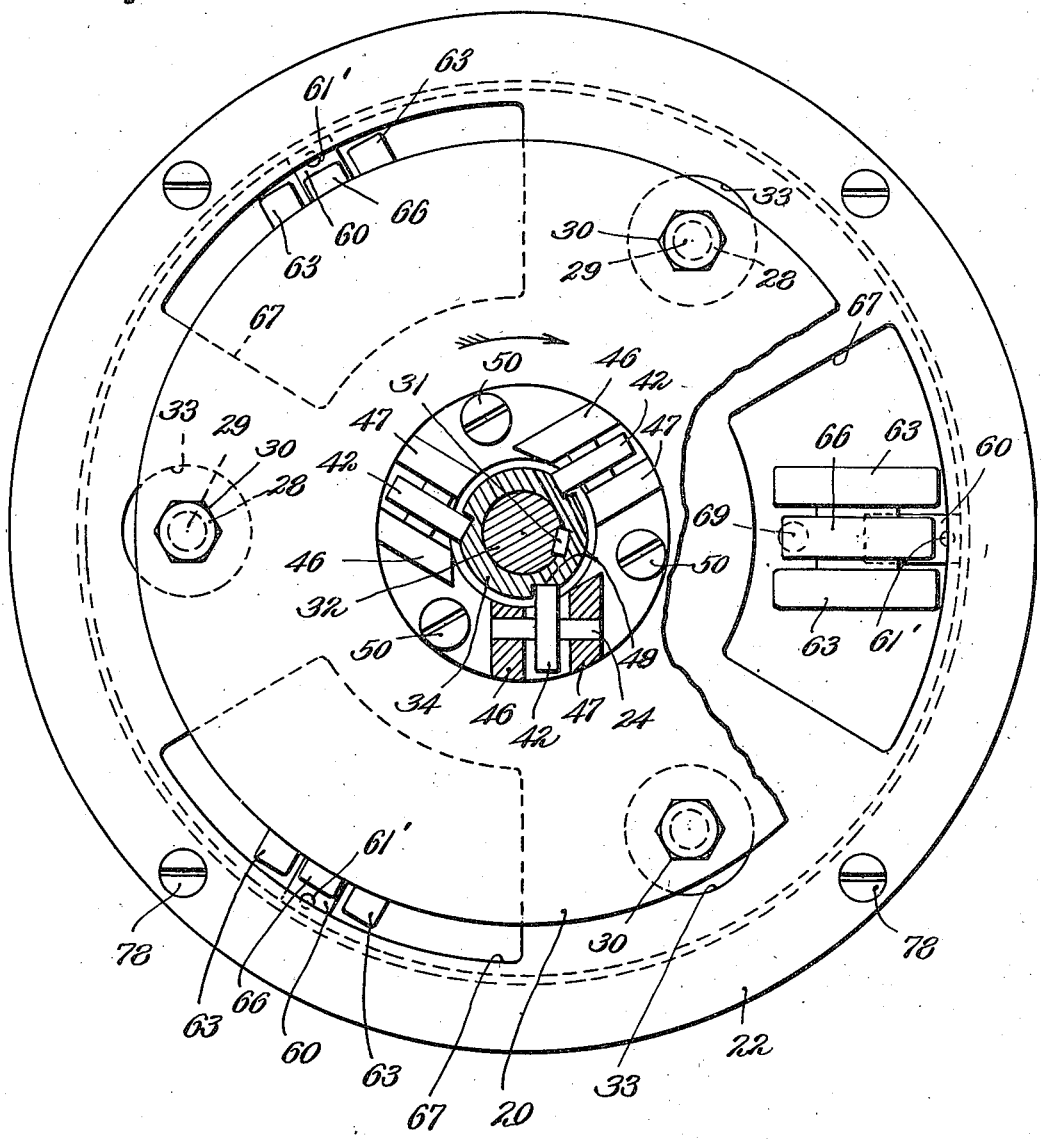
Fig. 2 is a horizontal section taken on the line 2—2 of Fig. 1.

My invention in its present form comprises four horizontal rotatable discs which may be characterized as follows:

A cam follower disc 20, a flywheel disc 22, a cam carrying disc 24, and a connection disc 26, whereby the assembly is connected to some form of speed indicating or speed control device. The discs 20 and 26 are rigidly connected by holdfast means spaced equidistantly around the disc and constitute a rotatable frame interposed between the prime mover or machine the speed of which is to be measured or governed or a motor running in synchronism therewith, and a speed indicating or speed governing device. In the present instance, said discs are clamped together by the hollow posts 28 and the bolts 29 passing therethrough and provided with nuts 30 at their upper ends. Said posts pass through circular openings 33, 33', in the discs 22, 24, respectively, said openings permitting relative tangential motion between the flywheel disc and the cam disc, and the walls thereof, in co-operation with said posts, forming stops to limit such tangential motion. At all times, the discs 20, 24, 26, rotate together at identical speeds but a change in the speed of the prime mover will cause tangential movement between such disc assembly and the disc 22, as hereinafter explained.

Figure 3:
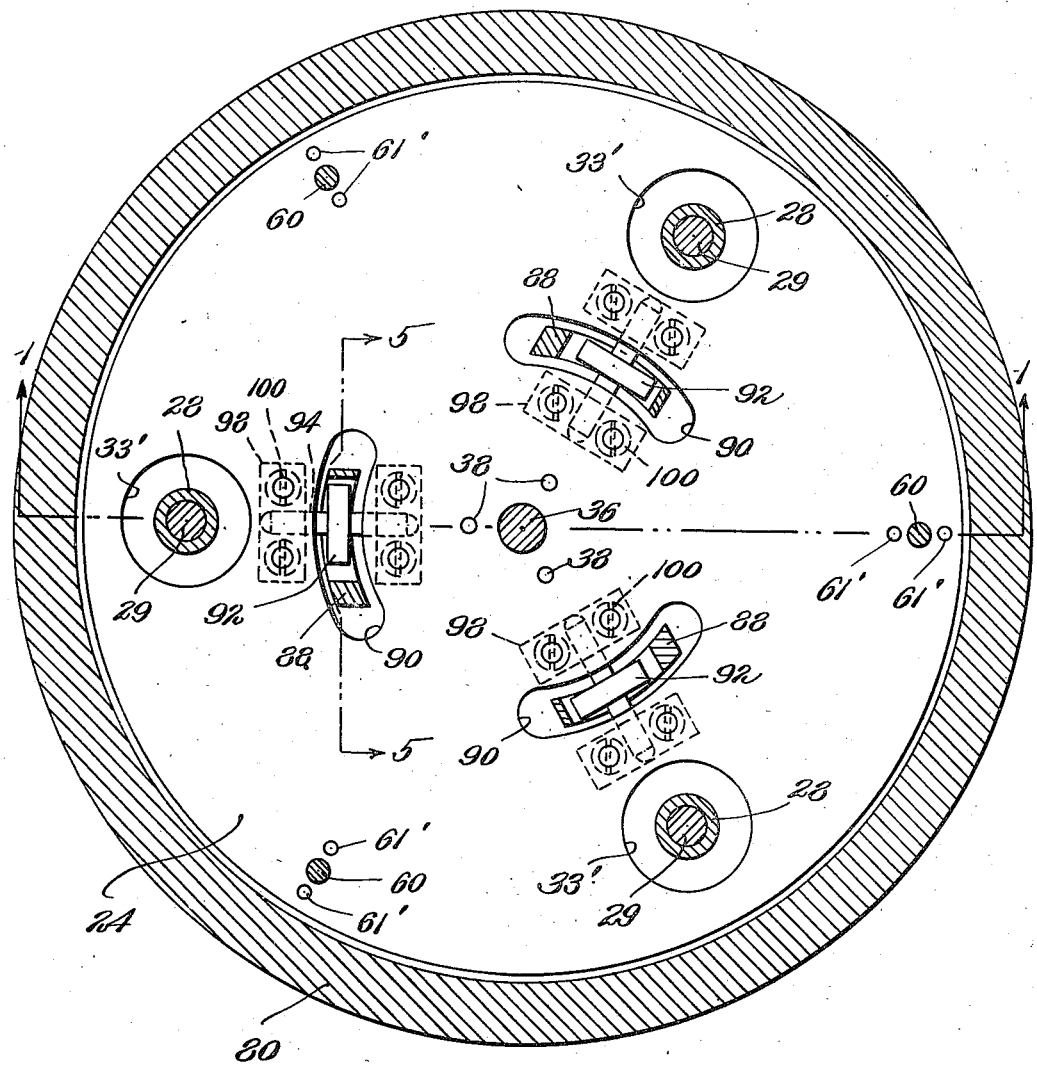
Fig. 3 is a horizontal section taken on the line 3—3 of Fig. 1.

Rotary movement is imparted to the whole disc assembly by a prime mover (not shown) the speed of which is desired to be measured or controlled, or by a motor (not shown) operating synchronously therewith. The end of the shaft 32 of such prime mover or motor is shown, in the present instance, as keyed by the key 31 to the hub 34 of my combined tachometer and accelerometer, the bolt 36 passing through a central bore in the disc 24 and said hub to clamp the hub and disc 24 together and secure the same to the prime mover shaft. Three spaced pins 38 (Figs. 1 and 3) are employed to reinforce the connection between said hub and the disc 24.

Figure 9:
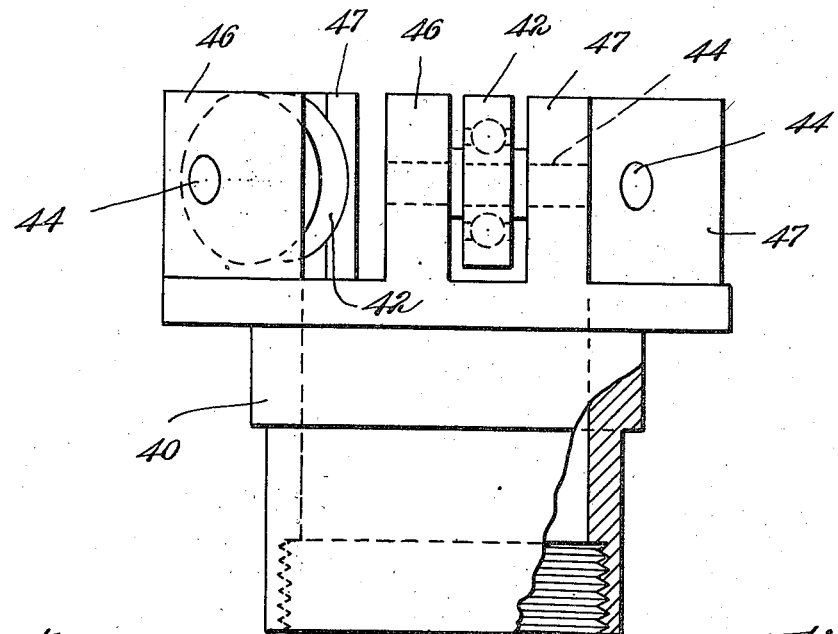
Fig. 9 is an elevation partly in section, drawn on an enlarged scale, of the hub sleeve which rotates with the hub and moves axially therewith.
Figure 10:
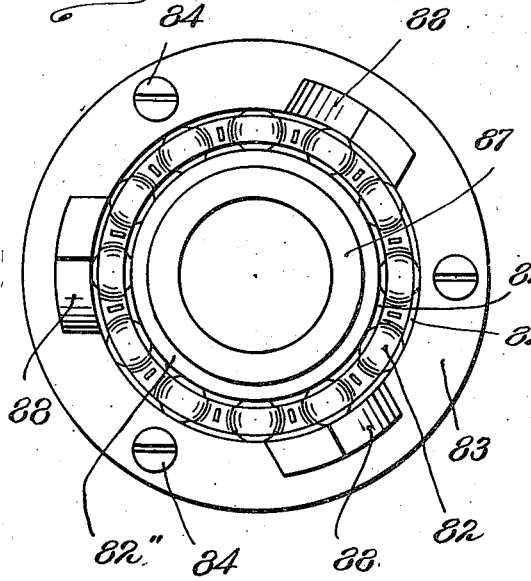
Fig. 10 is an under plan view of the helical cams and the ring from which they depend.
Figure 11:
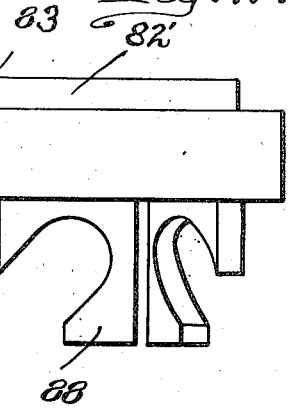
Fig. 11 is an elevation of said ring and helical cams.

Surrounding the hub 24 is a flanged sleeve 40 from the flange 41 of which rise three pairs of brackets 46, 47, equidistantly spaced around said flange. Disposed between each pair of brackets is roller 42 mounted for rotation on an axle 44 (Figs. 1 and 9) by ball bearing mounts.

Each roller co-operates with a flat 48 milled into the peripheral surface of the upper end portion of the hub, the plane passing through each with which they co-operate. The resulting tangential motion of the helical cams with respect to their co-operating rollers 92 is accompanied by a definitely related vertical axial motion of the flywheel disc with respect to the sleeve 40, and such motion will raise the disc assembly 20, 26, thereby moving the rod 76 upwardly and actuating the indicating or control apparatus above referred to as connected for actuation by said rod. In like manner, negative acceleration will have the opposite effect, and the rod 76 will move downwardly.

The response of the rod 76 to acceleration will be linear, that is to say, one unit of acceleration will produce one unit of force for all speeds throughout the range for which the apparatus is designed, and regardless of the position of the roller assemblies 63, 66, or the disc assembly 20, 26.

It has been found in practice that when the rod 76 is attached to the usual equipment used in connection with speed governors to control the supply of energy to prime movers, the present invention provides an extremely sensitive and quick acting precision governor, even although no dash pot or other antiracing appliances are used. The salient feature of the invention and one of the contributing causes of the precision and sensitiveness of the apparatus is the reduction of friction between the cams and their respective followers to a negligible amount by virtue of the rolling contacts between these elements and by the holding of such contacts to a minimum number.

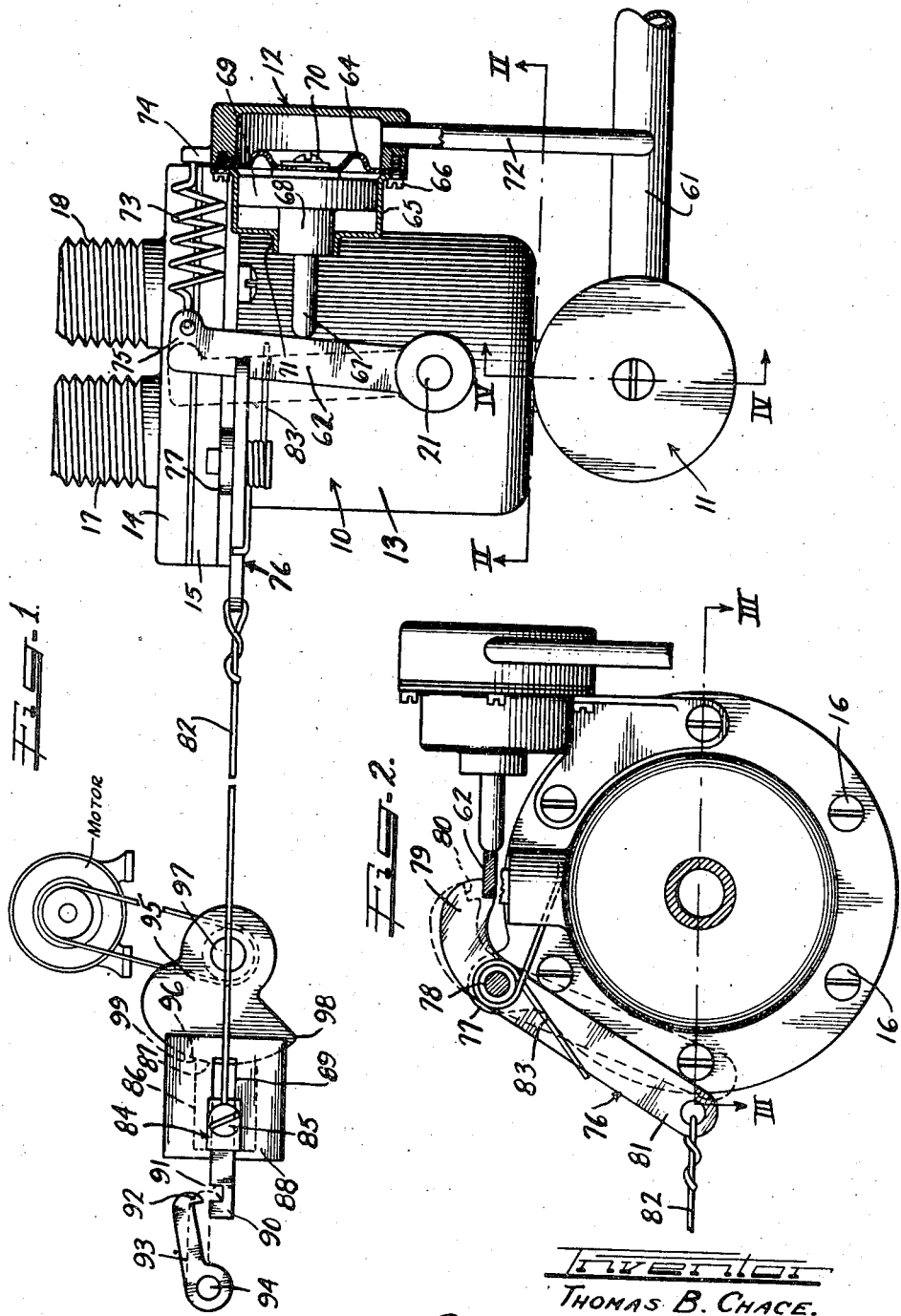

Having thus described illustrative embodiments of my invention without, however, limiting the same thereto, what I claim and desire to secure by Letters Patent is:

A combined tachometer and accelerometer comprising in combination, a rotatable member, a central hub secured to said member, said hub being constructed and arranged for attaching said member for rotation to a rotating element, a sleeve disposed around said hub for rotary movement therewith and axial movement thereto, a follower carried by said sleeve for rotary movement therewith, a cam carried by said rotatable member, a roller assembly interposed between said follower and said cam, said roller assembly having rolling contact with said follower and said cam, a flywheel mounted for rotation around said sleeve, a cam mounted on said flywheel, and a follower mounted on said rotatable member for co-operation with the cam last mentioned.

THOMAS W. BROWN.

REFERENCES CITED

The following references are of record in the file of this patent:

UNITED STATES PATENTS

| Number | Name | Date |
|---|---|---|
| 805,392 | Warren | Nov. 21, 1905 |
| 959,853 | Grant | May 31, 1910 |
| 1,130,659 | Baldwin | Mar. 2, 1915 |
| 1,135,054 | Schacht | Apr. 13, 1915 |
| 1,352,189 | Haeberlein | Sept. 7, 1920 |
| 1,880,815 | Cole | Oct. 4, 1932 |
| 2,146,046 | Bancroft | Feb. 7, 1939 |
| 2,157,542 | Kieser | May 9, 1939 |

FOREIGN PATENTS

| Number | Country | Date |
|---|---|---|
| 185,473 | Germany | July 1, 1907 |
| 420,429 | Germany | Oct. 23, 1925 |